(12) United States Patent
Kiwaki (10) Patent No.: US 9,205,705 B2
(45) Date of Patent: Dec. 8, 2015

(54) PNEUMATIC TIRE

(75) Inventor: Yukihiro Kiwaki, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 432 days.

(21) Appl. No.: 13/148,222

(22) PCT Filed: Feb. 10, 2010

(86) PCT No.: PCT/JP2010/051981
§ 371 (c)(1),
(2), (4) Date: Aug. 5, 2011

(87) PCT Pub. No.: WO2010/092987
PCT Pub. Date: Aug. 19, 2010

(65) Prior Publication Data
US 2011/0290391 A1    Dec. 1, 2011

(30) Foreign Application Priority Data

Feb. 10, 2009 (JP) .................................. 2009-028246

(51) Int. Cl.
*B60C 11/12* (2006.01)
*B60C 11/03* (2006.01)

(52) U.S. Cl.
CPC ........... *B60C 11/0304* (2013.04); *B60C 11/032* (2013.04); *B60C 11/0302* (2013.04);
(Continued)

(58) Field of Classification Search
CPC ............ B60C 11/0304; B60C 11/0318; B60C 11/032; B60C 2011/0348; B60C 2011/0381; B60C 2011/1236; B60C 11/12; B60C 11/1204; B60C 2011/1209

USPC ............... 152/209.8, 209.17, 209.27, DIG. 3, 152/209.16
See application file for complete search history.

(56) References Cited

U.S. PATENT DOCUMENTS 4,214,618 A * 7/1980 Takigawa et al. ......... 152/209.16
RE30,527 E * 2/1981 Verdier .................... 152/209.27
(Continued)

FOREIGN PATENT DOCUMENTS

CA         2018565    * 12/1990
JP      2003-285610 A   10/2003
(Continued)

OTHER PUBLICATIONS

English machine translation of JP2007-237816, no date.*
(Continued)

*Primary Examiner* — Richard Crispino
*Assistant Examiner* — Robert Dye
(74) *Attorney, Agent, or Firm* — Sughrue Mion, PLLC (57) ABSTRACT

Provision of a pneumatic tire with further enhanced low noise performance during running. Plural land portion rows are formed in a tread section (16) by forming circumferential direction main groove(s) extending along the tire circumferential direction. A fine-grooved-and-siped rib (34) configuring one of the land portion rows is configured with a fine groove (36) extending along the tire circumferential direction, a projecting sipe (38) projecting out from the fine groove (36) towards the side of a tire equatorial plane (CL) and open to a circumferential direction main groove (22E); and a plain rib portion (40) adjacent to the fine groove (36) on the vehicle mounting outside (SE), the plain rib portion (40) configured with a circular shaped peripheral face across the entire face on a ground contact side.

11 Claims, 5 Drawing Sheets

(52) U.S. Cl.
CPC ......... *B60C11/0306* (2013.04); *B60C 11/0309* (2013.04); *B60C 11/1236* (2013.04); *B60C 11/12* (2013.01); *B60C 2011/0348* (2013.04); *B60C 2011/0381* (2013.04)

(56) References Cited

U.S. PATENT DOCUMENTS

| | | | |
|---|---|---|---|
| 4,724,878 A * | 2/1988 | Kabe et al. | 152/209.14 |
| 8,297,323 B2 * | 10/2012 | Takahashi et al. | 152/209.25 |
| 2005/0103414 A1 * | 5/2005 | Suzuki | 152/209.5 |
| 2005/0269004 A1 | 12/2005 | Miyabe et al. | |
| 2007/0051448 A1 * | 3/2007 | Yumii | 152/209.18 |
| 2008/0142133 A1 | 6/2008 | Ochi | |
| 2009/0266459 A1 * | 10/2009 | Sato | 152/209.25 |
| 2009/0272474 A1 | 11/2009 | Nagai et al. | |

FOREIGN PATENT DOCUMENTS

| | | |
|---|---|---|
| JP | 2007-237816 A | 9/2007 |
| JP | 2007-302112 A | 11/2007 |
| WO | 2006/033383 A1 | 3/2006 |
| WO | 2007/072824 A1 | 6/2007 |
| WO | 2008/102780 A1 | 8/2008 |

OTHER PUBLICATIONS

English machine translation of JP2007-302112, no date.*
International Search Report for PCT/JP2010/051981 dated Mar. 23, 2010.
Extended European Search Report, dated Dec. 10, 2012, issued in corresponding European Patent Application No. 10741264.5.

* cited by examiner

PNEUMATIC TIRE

CROSS REFERENCE TO RELATED APPLICATIONS

This application is a National Stage of International Application No. PCT/JP2010/051981filed Feb. 10, 2010, claiming priority based on Japanese Patent Application No. JP 2009-28246 filed Feb. 10, 2009, the contents of all of which are incorporated herein by reference in their entirety.

TECHNICAL FIELD

The present invention relates to a pneumatic tire, and more specifically to a pneumatic tire particularly appropriate as a pneumatic radial tire.

BACKGROUND ART

A pneumatic tire is generally configured with a tread portion formed with main grooves running along the tire circumferential direction, with land portion rows extending along the tire circumferential direction formed by the main grooves. When a fine groove or sipes are formed in such a land portion row then normally either a fine groove and sipes are disposed so as to be independent of each other, or sipes are formed so as to extend out from a fine groove so as to communicate with a main groove.

Patent Document 1: Japanese Patent Application Laid-Open (JP-A) No. 2007-302112

SUMMARY OF INVENTION

Technical Problem

However there is an existing need to reduce air column resonance noise that occurs in the main groove of such a pneumatic tire.
Patent Document 1 describes forming L-shaped bent grooves in the tread portions to address this issue.
However, a tire construction that reduces the air column resonance noise further and achieves enhanced low noise performance during running is desired.
The present invention is made in consideration of the above circumstances and addresses the provision of a pneumatic tire that further enhances low noise performance during running.

Solution to Problem

A first aspect of the present invention is configured with plural land portion rows formed in a tread section by forming a circumferential direction main groove extending along the tire circumferential direction. At least one row of the land portion rows includes: a fine groove extending along the tire circumferential direction; a sipe projecting out from the fine groove towards one side in the tire width direction and open to the circumferential direction main groove; and a plain rib portion adjacent to the fine groove on the other side in the tire width direction, the plain rib portion is configured with a circular shaped peripheral face across the entire face of the plain rib portion on a ground contact side.

In the first aspect of the present invention, the fine groove and the sipe are formed in at least one of the land portion rows. The frequency of air column resonance noise emitted from the main groove is thereby shifted by the Helmholtz effect, and resonance noise can be greatly reduced.

The plain rib portion is also formed adjacent to the fine groove. The braking performance can be secured by a thin rib region elongated along the ground contact length. Lateral rigidity can be secured and handling stability can be enhanced due to the block region configured by the fine groove and the sipes and the thin rib region being placed in a closely adjacent configuration.

In a second aspect of the present invention, the fine groove is configured by short fine grooves intermittent along the tire circumferential direction, the sipe projects out from an end portion of each of the short fine grooves such that a substantially L-shaped figure is traced by the short fine groove and the sipe; and a single-side-opening groove is formed in the tread section extending out inclined to the tire circumferential direction from a circumferential direction main groove into a different land portion row than the land portion row formed with the sipes and is closed off in the different land portion row.

There are interrupt portions of the fine groove between short fine grooves, with these functioning as land portions to reinforce the land portion row formed with the fine groove and the sipes.

In a third aspect of the present invention, each substantially L-shaped figure and each single-side-opening groove are disposed in the tread section such that the substantially L-shaped figures and the single-side-opening groove are disposed in alternating positions around the tire circumferential direction.

In the third aspect of the present invention each substantially L-shaped figure and each single-side-opening groove are often disposed in a staggered pattern.

In a fourth aspect of the present invention, the single-side-opening groove passes through a position in the tire circumferential direction between adjacent ones of the short fine grooves.

In the fourth aspect of the present invention, even when noise is emitted during running due to tire vibration at the land portions, a reduction in noise is possible by the placement of the single-open-sided grooves as described above.

A fifth aspect of the present invention is configured with a shoulder land portion row formed adjacent to the plain rib portion on the width direction outside of the plain rib portion, with a fine groove or a sipe between the shoulder land portion row and the plain rib portion.

A configuration can accordingly be achieved without a circumferential direction main groove present between the plain rib portion and the shoulder land portion row. Consequently, the efficiency of water expulsion can be raised in comparison to a conventional configuration in which there is a circumferential direction main groove formed between the plain rib portion and the shoulder land portion row, by allocating the circumferential direction main groove to another region of the tread section to give better water expulsion ability. Rigidity is increased and enhance abrasion resistance is achieved due to contact under loading with at least a portion of the wall face of the fine groove or the sipe.
The width of the fine groove or the sipe adjacent to the plain rib portion is normally within the range of 0.4 to 1.5 mm.

In a sixth aspect of the present invention, the vehicle mounting direction is stipulated, and the land portion row on the vehicle mounting outermost side is a row of blocks.

Accordingly the effective axial direction width of the block row on the vehicle mounting outermost side is widened. Consequently, not only can handling stability be further raised but it is also possible to generate a Helmholtz effect in the outermost main groove that has the greatest influence on external vehicle noise.

According to the present invention a pneumatic tire can be obtained with further enhanced low noise performance during running.

DESCRIPTION OF EMBODIMENTS

Explanation follows regarding exemplary embodiments of the present invention, giving examples of pneumatic radial tires as the exemplary embodiments. From a second exemplary embodiment onwards configuration elements similar to configuration elements that have already been explained are allocated the same reference numerals and further explanation is omitted.

First Exemplary Embodiment

Figure 1:
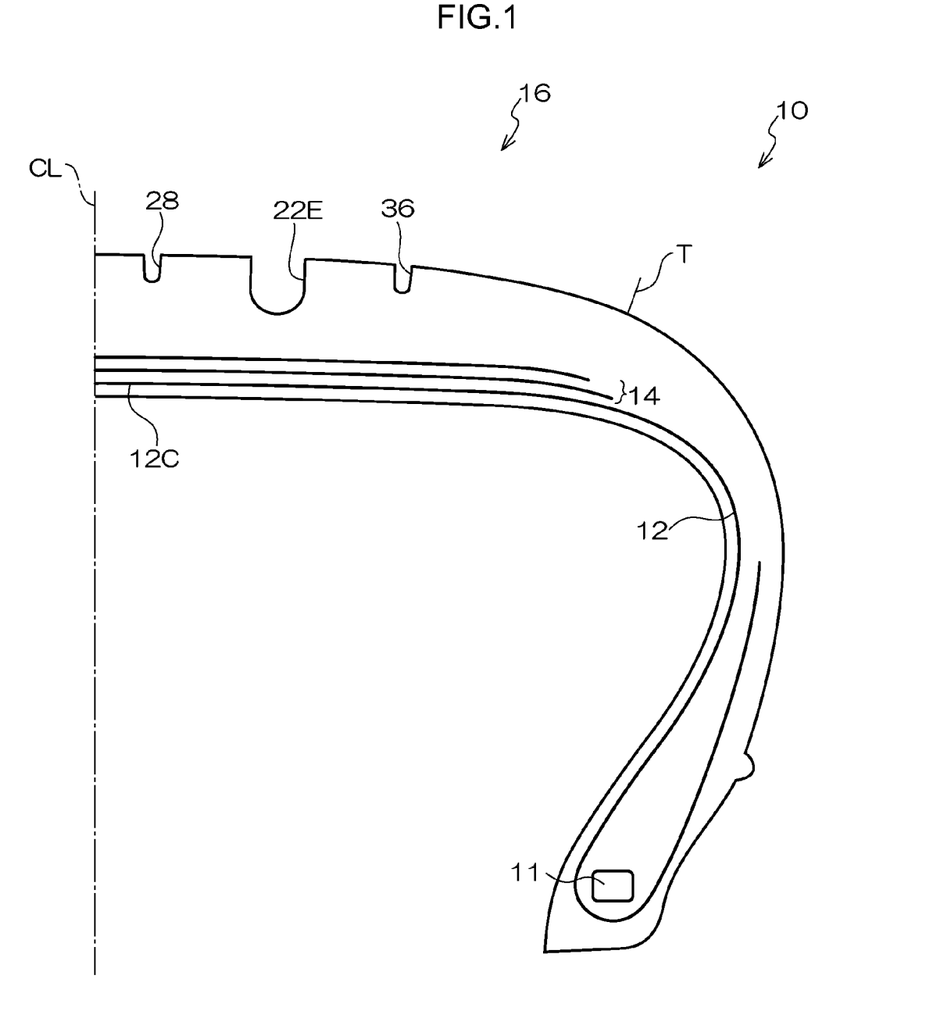
FIG. 1 is a tire radial direction cross-section of a pneumatic radial tire according to a first exemplary embodiment.

Explanation will first be made regarding a first exemplary embodiment. As shown in FIG. 1, a pneumatic radial tire 10 of the first exemplary embodiment is provided with a carcass 12 configured with two edge portions of a single or plural layers folded around a bead core 11.

A belt layer 14 formed from plural superimposed sheets (for example 2 sheets) of belt ply are buried at the tire radial direction outside of a crown portion 12C of the carcass 12.

Figure 2:
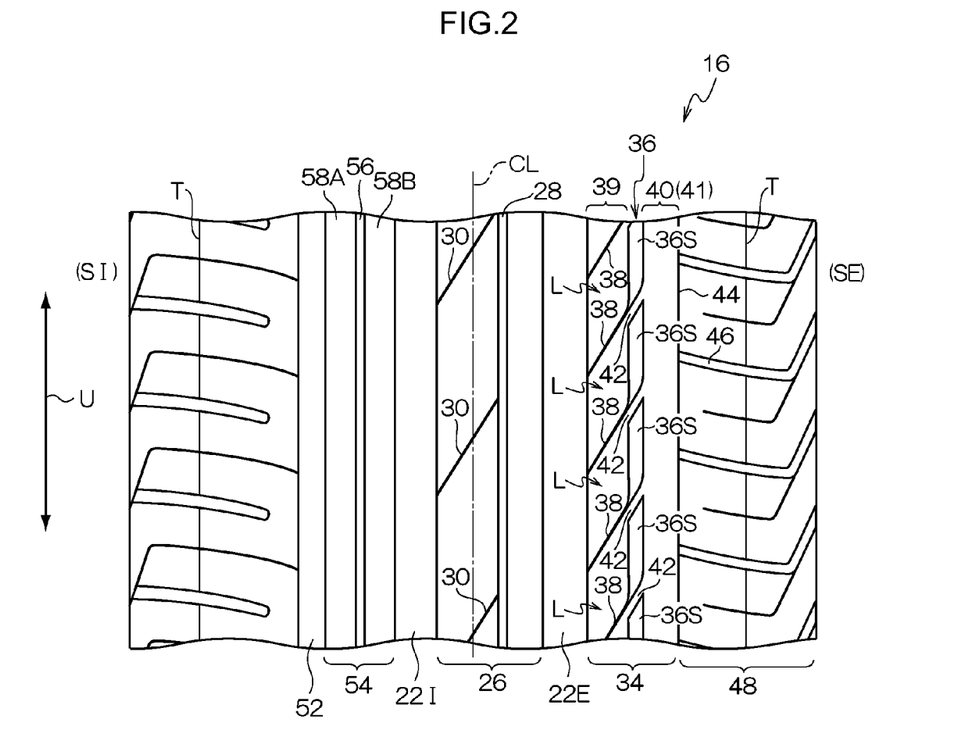
FIG. 2 is a plan view showing a tread section of a pneumatic radial tire according to the first exemplary embodiment.

A tread section 16 disposed with grooves is formed at the tire radial direction outside of the belt layer 14. Circumferential direction main grooves 22E, 22I are formed at the two respective sides of a tire center line CL so as to run along the tire circumferential direction U, as shown in FIG. 2. The pneumatic radial tire 10 is a tire with stipulated vehicle mounting direction, with the circumferential direction main groove 22E being a main groove formed on the vehicle mounting exterior side SE of the tire center line CL, and the circumferential direction main groove 22I being a main groove formed on the vehicle mounting inside SI of the tire center line CL.

A central rib 26 is formed in the tread section 16 by the two circumferential direction main grooves 22E, 22I extending along the tire circumferential direction U. A central fine groove 28 is formed in the central rib 26 extending along the tire circumferential direction at a position slightly to the vehicle mounting outside of the tire center line CL, and central sipes 30 are formed in the central rib 26 so as to extend from the central fine groove 28 as far as the circumferential direction main groove 22I.

A fine-grooved-and-siped rib 34 is formed on the vehicle mounting outside of the circumferential direction main groove 22E. A fine groove 36 is formed in the fine-grooved-and-siped rib 34 extending along the tire circumferential direction. Projecting sipes 38 are also formed in the fine-grooved-and-siped rib 34 so as to project diagonally out from the fine groove 36 towards the vehicle mounting inside and opening onto the circumferential direction main groove 22E. The fine groove 36 is configured with short fine grooves 36S that lie intermittently along the tire circumferential direction.

The projecting sipes 38 project out from end portions of the respective short fine grooves 36S as far as the circumferential direction main groove 22E, such that respective substantially L-shaped figures are traced out by the short fine grooves 36S and the projecting sipes 38.

A plain rib 40 is also formed in the fine-grooved-and-siped rib 34, extending along the tire circumferential direction adjacent to and at the vehicle mounting outside of the fine groove 36. There are no indented portions, such as sipes, grooves, or cuts formed on the ground contact face side of the plain rib 40, such that a circular shaped peripheral face is formed across the entire face of the plain rib 40.

In the present exemplary embodiment there are land portions 42 integrally contiguous to the plain rib 40 and located between adjacent short fine grooves in the tire circumferential direction. The land portions 42 are located at interrupt portions of the fine groove 36 and function to reinforce the fine-grooved-and-siped rib 34.

In the present exemplary embodiment an abutting sipe 44 is formed extending along the tire circumferential direction at the vehicle mounting outside of the plain rib 40. Lug grooves 46 are also formed connected to the abutting sipe 44 and projecting out towards the vehicle mounting outside past the tread edge T, thereby enabling water to be expelled to the tire width direction outside. By adopting such a configuration a block row (shoulder block row) 48 is formed on the vehicle mounting outside of the abutting sipe 44, as an outermost row of land portions on the vehicle mounting outside. The lug grooves 46 of the block row (shoulder block row) 48 are open to the abutting sipe 44.

Reference here to the tread edge here indicates the tire width direction outermost ground contact portion when the pneumatic tire is mounted to a standard rim, as defined in the JATMA YEAR BOOK (2007 edition, Japan Automobile Tire Manufacturers Association standards), inflated to an internal pressure of 100% of the pressure (maximum pressure) corresponding to maximum load (load shown in bold type in the internal pressure—load chart) in the JATMA YEAR BOOK for the applicable size/ply rating, and applied with the maximum load. It should be noted that where the location of use or manufacturing location use TRA standards or ETRTO standards, then accordance is made to these respective standards.

A circumferential direction main groove 52 is formed at the vehicle mounting inside of the circumferential direction main groove 22I, with a fine-grooved and siped rib 54 formed by the circumferential direction main groove 22I and the circumferential direction main groove 52. A fine groove 56 is formed at a rib width direction central position on the fine-grooved and siped rib 54, so as to form two rib regions 58A, 58B at the ground contact face side.

As explained above, in the present exemplary embodiment the fine groove 36 and the projecting sipes 38 are formed in the fine-grooved-and-siped rib 34 that extends along the tire circumferential direction. The frequency of air column resonance noise emitted from the main groove is thereby shifted by the Helmholtz effect, and resonance noise can be greatly reduced.

The plain rib 40 is formed in the fine-grooved-and-siped rib 34 adjacent to the fine groove 36. The braking performance can be secured by a thin rib region 41 elongated along the ground contact length. Lateral rigidity can be secured and handling stability can be enhanced due to the block region 39 configured by the fine groove 36 and the projecting sipes 38 and the thin rib region 41 being placed in a closely adjacent configuration.

The plain rib 40 is configured adjacent to the block row (shoulder block row) 48 at the width direction outside of the plain rib 40, on the other side of the abutting sipe 44. A configuration can accordingly be achieved without a circumferential direction main groove present between the plain rib 40 and the block row 48. Consequently, the efficiency of water expulsion can be raised in comparison to a conventional configuration in which there is a circumferential direction main groove formed between the plain rib 40 and the block row 48, by allocating the circumferential direction main groove to another region of the tread section 16 to give better water expulsion ability (in the present exemplary embodiment the groove width of the circumferential direction main grooves 22I, 22E, 52 is widened).

The tire vehicle mounting direction is also stipulated in the present exemplary embodiment and the block row 48 is a row of land portions on the vehicle mounting outermost side. The plain rib 40 is adjacent to the block row 48 on the other side of the abutting sipe 44. Accordingly the effective tire axial direction width (width in the tire width direction) of the block row 48 on the vehicle mounting outermost side is widened to a width including the plain rib 40. Consequently, not only can handling stability be further raised but it is also possible to generate a Helmholtz effect in the outermost main groove that has the greatest influence on external vehicle noise.

The land portions 42 between mutually adjacent short fine grooves function to reinforce the fine-grooved-and-siped rib 34. The fine-grooved-and-siped rib 34 accordingly has high strength and good durability even though the fine-grooved-and-siped rib 34 is formed with the fine groove 36.

Figure 3:
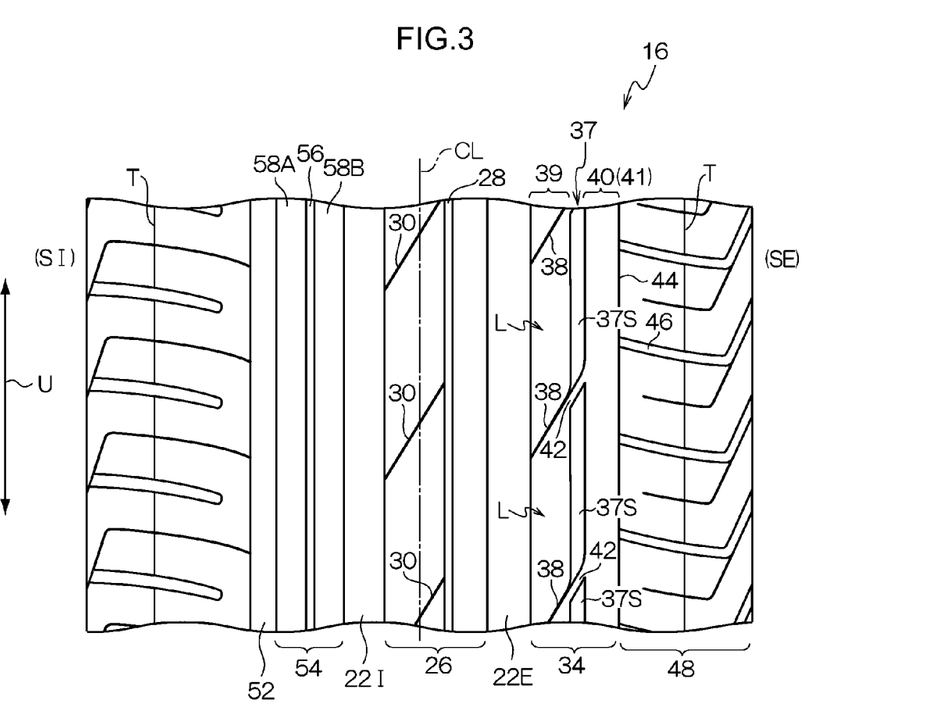
FIG. 3 is a plan view showing a modified example of a tread section of a pneumatic radial tire according to the first exemplary embodiment.

In a modified example of the present exemplary embodiment, as shown in FIG. 3, instead of the short fine grooves 36S configuration may be made by disposing lengthened short fine grooves 37S that are longer in circumferential direction length than the short fine grooves 36S. In such cases projecting sipes 38 are formed projecting out inclined towards the vehicle mounting inside from respective lengthened short fine grooves 37S and open to the circumferential direction main groove 22E. The circumferential direction length of the lengthened short fine grooves 37S is set longer than the circumferential direction interval of the lug grooves 46. The number of individual lengthened short fine grooves 37S is accordingly less than the number of individual short fine grooves 36S, however rib rigidity is secured and abrasion resistance can be raised due to being able to reduce the number of the sipes 38.

Second Exemplary Embodiment

Figure 4:
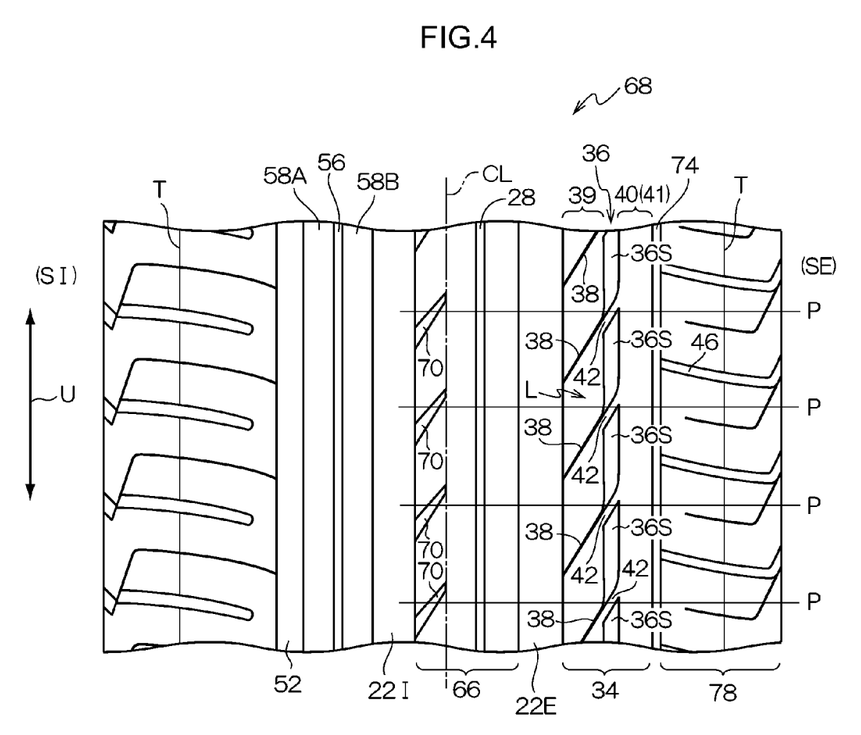
FIG. 4 is a plan view showing a tread section of a pneumatic radial tire according to a second exemplary embodiment.

Explanation follows regarding a second exemplary embodiment. The present exemplary embodiment is configured as shown in FIG. 4 with a central rib 66 formed in a tread portion 68 instead of the central rib 26 of the first exemplary embodiment. Single-open-sided grooves 70 are formed in the central rib 66 instead of the central sipes 30.

An adjacent fine groove 74 is also formed in place of the abutting sipe 44. Consequently, the fine-grooved-and-siped rib 34 is adjacent to a vehicle mounting outermost block row (shoulder block row) 78, on the other side of the adjacent fine groove 74. The lug grooves 46 of the block row (shoulder block row) 78 are open to the adjacent fine groove 74.

The single-open-sided grooves 70 are open to the circumferential direction main groove 22I and project out into the central rib 66, past the tire circumferential direction position P of the land portions 42 (namely pass a position corresponding to the tire circumferential direction position P of the land portions 42) into the central rib 66 where the single-open-sided grooves 70 are closed off. According to such a configuration the substantially L shaped figures, the single-open-sided grooves 70, and the tire circumferential direction positions P are disposed in turn along the tire circumferential direction. The single-open-sided grooves 70 are configured only with a groove component inclined to the tire circumferential direction U and with no groove component parallel to the tire circumferential direction U.

In the present exemplary embodiment, even when noise is emitted during running due to tire vibration at the land portions 42, unevenness in the rigidity distribution in the tire circumferential direction of the tread portion 68 is relieved by the placement of the single-open-sided grooves 70, enabling a reduction in noise to be achieved.

The plain rib 40 is also formed adjacent to the block row (shoulder block row) 78 on the width direction outside of the plain rib 40, on the other side of the adjacent fine groove 74. Configuration can accordingly be achieved without a circumferential direction main groove formed between the plain rib 40 and the block row 78. Consequently, the efficiency of water expulsion can be raised compared to a conventional configuration in which there is a circumferential direction main groove formed between the plain rib 40 and the block row 78, by allocating the circumferential direction main groove to another region of the tread section 68 to give better water expulsion ability (in the present exemplary embodiment the groove width of the circumferential direction main grooves 22I, 22E, 52 is widened).

Test Example

In order to confirm the effect of the present invention the inventor prepares an example of the pneumatic radial tire 10 of the first exemplary embodiment (see FIG. 1 and FIG. 2, referred to as Example Tire 1), an example of the pneumatic tire of the second exemplary embodiment (see FIG. 4, referred to as Example Tire 2), and an example of a conventional pneumatic tire (see FIG. 5, referred to below as Conventional Tire Example), and evaluate the tire performance according to performance testing.

All of the tires in the tests are summer tires and all have a tire size of 225/45 R17.

Figure 5:
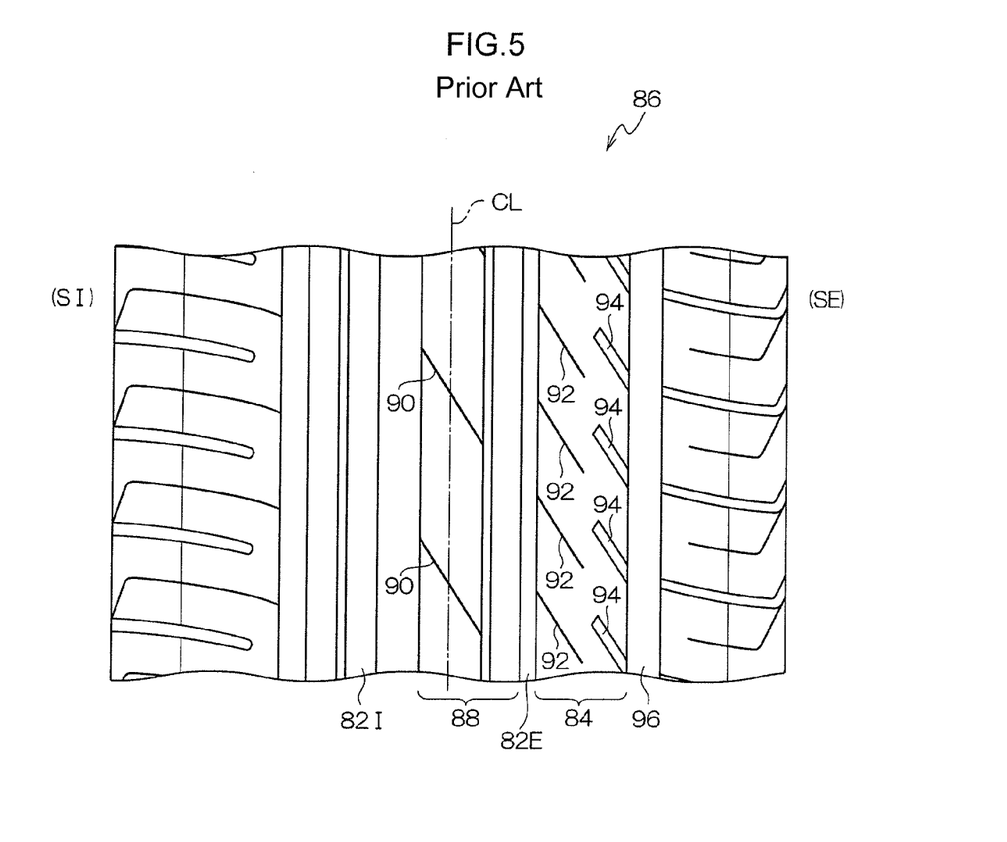
FIG. 5 is a plan view showing a tread section of a conventional pneumatic radial tire employed in a test example.

In contrast to the Example Tire 1, the Conventional Tire Example is configured with a central rib 88 formed in a tread portion 86 in place of the central rib 26, as shown in FIG. 5. There are also main grooves 82E, 82I extending in the tire circumferential direction formed at both tire width direction sides of the central rib 88, with the width of the main groove 82E set narrower than that of the main groove 22E. A fine-grooved-and-siped rib 84 is also formed in the tread portion 86 in place of the fine-grooved-and-siped rib 34.

Central sipes 90 are formed in the central rib 88, inclined in an opposite direction to the central sipes 30. Inclined sipes 92 are formed running along the same direction as the central sipes 90 at a vehicle mounting inside portion of the fine-grooved-and-siped rib 84, and inclined grooves 94 are formed running along the same direction as the central sipes 90 at a vehicle mounting outside portion of the fine-grooved-and-siped rib 84.

A circumferential direction main groove 96 is also formed at the vehicle mounting outside of the fine-grooved-and-siped rib 84.

In the test examples, after assembling all of the tires onto a rim of 7J-17 rim width, tires are mounted to a Japanese manufactured sedan, and inflated to the specified vehicle internal pressure (standard internal pressure) for the vehicle when loaded with an additional 600N for the body weight of a driver. When the Example Tire 1 is mounted the Example Tire 1 is mounted to all of the vehicle wheels (the two front and two rear wheels). Similarly, when the Conventional Tire Example is mounted the Conventional Tire Example is mounted to all of the vehicle wheels.

Braking performance evaluation is performed for all of the mounted tires by measuring the rate of deceleration from 100 km/h with the ABS function activated.

Testing is also made by running all of the mounted tires by running on road surfaces of a normal road and on a circuit, and evaluating by driver feeling the handling stability and low noise performance.

An evaluation index is employed in evaluation, with a relative evaluation applied to the Example Tire 1 relative to evaluation of the Conventional Tire Example set at an evaluation index of 100.

Evaluation Results are shown in Table 1.

|  | Conventional Tire Example | Example Tire 1 | Example Tire 2 |
|---|---|---|---|
| Braking Performance Evaluation | 100 | 102 | |
| Handling Stability Evaluation | 100 | 105 | |
| Low Noise Performance Evaluation | 100 | 105 | 107 |

The higher the evaluation index in the evaluation results of Table 1 the higher the performance. It can be seen from Table 1 that the Example Tire 1 has a higher evaluation than the Conventional Tire Example in all of braking performance, handling stability performance and low noise performance.

Similarly for the Example Tire 2 the present inventors, tires are mounted to a Japanese manufactured sedan after assembling to rims of 7J-17 rim width, inflated to the specified internal pressure for the vehicle when loaded with an additional 600N for the body weight of a driver. When the Example Tire 2 is mounted the Example Tire 2 is mounted to all of the vehicle wheels.

Testing is also made by running on road surfaces of a normal road and a circuit, and evaluating low noise performance by driver feeling. An evaluation index is computed as a relative evaluation with respect to the Conventional Tire Example, with an evaluation of the Conventional Tire Example set an evaluation index of 100. Results are combined in Table 1.

As can be seen from Table 1, the Example Tire 2 is even more highly rated for low noise performance than the Example Tire 1.

While explanation of exemplary embodiments of the present invention has been given by means of the above exemplary embodiments, these exemplary embodiments are merely examples, and various modifications can be made within a scope not departing from the spirit of the invention. Obviously the scope of patent rights of the present invention is also not limited by these exemplary embodiments.

The invention claimed is:

1. A pneumatic tire comprising a plurality of land portion rows formed in a tread section by forming a circumferential direction main groove extending along the tire circumferential direction, wherein at least one row of the land portion rows comprises:
   a plurality of fine grooves extending intermittently along the tire circumferential direction;
   at least one projecting sipe projecting out from the plurality of fine grooves towards one side in the tire width direction and open to the circumferential direction main groove; and
   a plain rib portion adjacent to the plurality of fine grooves on the other side in the tire width direction, the plain rib portion configured with a circular shaped peripheral face across the entire face of the plain rib portion on a ground contact side, wherein
   a shoulder land portion row is formed adjacent to the plain rib portion on the width direction outside of the plain rib portion, with at least one of fine groove and sipe between the shoulder land portion row and the plain rib portion,
   the at least one of fine groove and sipe between the shoulder land portion row and the plain rib portion is formed continuously around the whole tire circumference, and
   a width of the at least one of fine groove and sipe is within the range of 0.4 to 1.5 mm.

2. The pneumatic tire of claim 1, wherein:
   the at least one projecting sipe comprises a plurality of projecting sipes projecting out from an end portion of each of the plurality of fine grooves such that a substantially L-shaped figure is traced by the plurality of fine grooves and the plurality of projecting sipes; and
   a single-side-opening groove is formed in the tread section extending out inclined to the tire circumferential direction from a circumferential direction main groove into a different land portion row than the land portion row formed with the plurality of projecting sipes and is closed off in the different land portion row.

3. The pneumatic tire of claim 2, wherein each substantially L-shaped figure and each single-side-opening groove are disposed in the tread section such that the substantially L-shaped figure and the single-side-opening groove are disposed in alternating positions around the tire circumferential direction.

4. The pneumatic tire of claim 3, wherein the single-side-opening groove passes through a position in the tire circumferential direction between adjacent ones of the plurality of fine grooves.

5. The pneumatic tire of claim 1, wherein the vehicle mounting direction is stipulated, and the land portion row on the vehicle mounting outermost side is a row of blocks.

6. The pneumatic tire of claim 1, wherein lug grooves are formed through blocks in a row of blocks, the lug grooves being open to the at least one of fine groove and sipe.

7. The pneumatic tire of claim 1, further comprising:
   a second circumferential direction main groove extending along the tire circumferential direction, formed at a vehicle mounting inside of a tire center line;
   a central rib region formed between the circumferential direction main grooves extending along the tire circumferential direction,
   a central fine groove formed in the central rib region extending along the tire circumferential direction at a position to the vehicle mounting outside of the tire center line;
   wherein central sipes are formed in the central rib region so as to extend from the central fine groove as far as the second circumferential direction main groove.

8. The pneumatic tire of claim 7, further comprising:
   a central plain rib portion,
   wherein:
      the central plain rib portion is formed between the central fine groove and the circumferential direction main groove; and
      the central plain rib portion includes a continuous land portion extending along the tire circumferential direction.

9. The pneumatic tire of claim 7, wherein:
   the circumferential direction main groove is formed at the position to the vehicle mounting outside of the tire center line; and
   the central rib region is formed across the tire center line.

10. The pneumatic tire of claim 7, wherein:
the at least one projecting sipe comprises a plurality of projecting sipes;
a first wall face of the circumferential direction main groove toward the position to the vehicle mounting outside of the tire center line is continuous between the plurality of projecting sipes; and
a second wall face of the circumferential direction main groove toward the position to the vehicle mounting inside of the tire center line is continuous.

11. The pneumatic tire of claim 7, further comprising:
a third circumferential direction main groove extending along the tire circumferential direction, formed at the vehicle mounting inside of the circumferential direction main groove;
wherein:
a fine-grooved and siped rib is formed between the second circumferential direction main groove and the third circumferential direction main groove.

* * * * *